US010712756B2

(12) United States Patent
Klaus et al.

(10) Patent No.: US 10,712,756 B2
(45) Date of Patent: Jul. 14, 2020

(54) MIXING VALVE ARRANGEMENT FOR A HYDRAULIC SYSTEM, INCLUDING AN OIL COOLING SYSTEM AND COMPRESSOR SYSTEM

(71) Applicant: GARDNER DENVER DEUTSCHLAND GMBH, Bad Neustadt (DE)

(72) Inventors: Frank Georg Klaus, Zell-Barl (DE); Ulrich Thomes, Kuelz (DE); Nicolas Henn, Simmern (DE)

(73) Assignee: GARDNER DENVER DEUTSCHLAND GMBH, Bad Neustadt (DE)

( * ) Notice: Subject to any disclaimer, the term of this patent is extended or adjusted under 35 U.S.C. 154(b) by 109 days.

(21) Appl. No.: 15/955,152

(22) Filed: Apr. 17, 2018

(65) Prior Publication Data

US 2018/0299912 A1 Oct. 18, 2018

(30) Foreign Application Priority Data

Apr. 18, 2017 (DE) .......................... 10 2017 108 186

(51) Int. Cl.
*G05D 23/13* (2006.01)
*F16N 39/02* (2006.01)
(Continued)

(52) U.S. Cl.
CPC .......... *G05D 23/134* (2013.01); *F04B 1/2035* (2013.01); *F04B 39/06* (2013.01);
(Continued)

(58) Field of Classification Search
CPC ............ F04B 1/2035; F04B 2201/0402; F04B 39/06; F04B 53/18; F16N 2250/08;
(Continued)

(56) References Cited

U.S. PATENT DOCUMENTS 6,286,464 B1 * 9/2001 Abraham ............. G05D 23/134
122/14.31
6,460,567 B1 10/2002 Hansen, III et al.
(Continued)

FOREIGN PATENT DOCUMENTS

DE 102006024069 A1 11/2007
DE 102006054131 A1 5/2008
(Continued)

OTHER PUBLICATIONS

German Patent Office Action for Application No. 102017108186.0 dated Mar. 12, 2018 (8 pages, statement of relevance included).
(Continued)

*Primary Examiner* — Henry T Crenshaw
(74) *Attorney, Agent, or Firm* — Michael Best & Friedrich LLP

(57) ABSTRACT

A mixing valve arrangement for a hydraulic system is provided with a medium cavity, in which a mixing cylinder, a first and a second inlet chamber as well as an outlet are provided. A mixing piston is axially mounted and movable in the mixing cylinder, provided with a flow path with an inlet opening, a variable cross-section of said inlet opening culminating into the first and/or the second inlet chamber, according to the axial position of the mixing piston, and with an outlet opening culminating in the outlet of the mixing cylinder. A thrust rod is axially mounted and movable and connected to the mixing piston, to change the axial position thereof. A drive is connected as an actuator to the thrust rod, for the axial movement of the same. The drive is an electrical motor, which is completely arranged inside the medium cavity.

6 Claims, 1 Drawing Sheet

(51) Int. Cl.
*F16N 39/04* (2006.01)
*F04B 53/18* (2006.01)
*F04B 1/2035* (2020.01)
*F04B 39/06* (2006.01)

(52) U.S. Cl.
CPC .............. *F04B 53/18* (2013.01); *F16N 39/02* (2013.01); *F16N 39/04* (2013.01); *F04B 2201/0402* (2013.01); *F16N 2250/08* (2013.01); *F16N 2280/00* (2013.01)

(58) Field of Classification Search
CPC ...... F16N 2280/00; F16N 39/02; F16N 39/04; G05D 23/134
See application file for complete search history.

(56) References Cited

U.S. PATENT DOCUMENTS

| | | | | |
|---|---|---|---|---|
| 2010/0286791 | A1* | 11/2010 | Goldsmith | A61B 17/12022 623/23.7 |
| 2012/0012766 | A1* | 1/2012 | Gauss | F16K 1/123 251/129.01 |
| 2012/0321486 | A1* | 12/2012 | Scarpinato | F04B 39/02 417/228 |
| 2013/0004335 | A1* | 1/2013 | Hu | F04B 35/045 417/45 |
| 2014/0163664 | A1* | 6/2014 | Goldsmith | A61B 17/00491 623/1.11 |
| 2014/0338769 | A1 | 11/2014 | Schröder | |
| 2015/0168020 | A1* | 6/2015 | Wehner | F24S 40/55 126/714 |
| 2015/0168960 | A1 | 6/2015 | Huck et al. | |
| 2015/0219085 | A1* | 8/2015 | Yamaoka | F04B 39/10 417/312 |
| 2016/0018831 | A1* | 1/2016 | Lamb | G05D 23/134 236/12.1 |
| 2016/0108901 | A1* | 4/2016 | Kronpass | F04B 1/2071 417/269 |

FOREIGN PATENT DOCUMENTS

EP 2484911 A2 8/2012
EP 2526297 B1 11/2012

OTHER PUBLICATIONS

European Search Report for Application No. 18164780.1 dated May 28, 2018 (6 pages, Statement of Relevance included).

\* cited by examiner

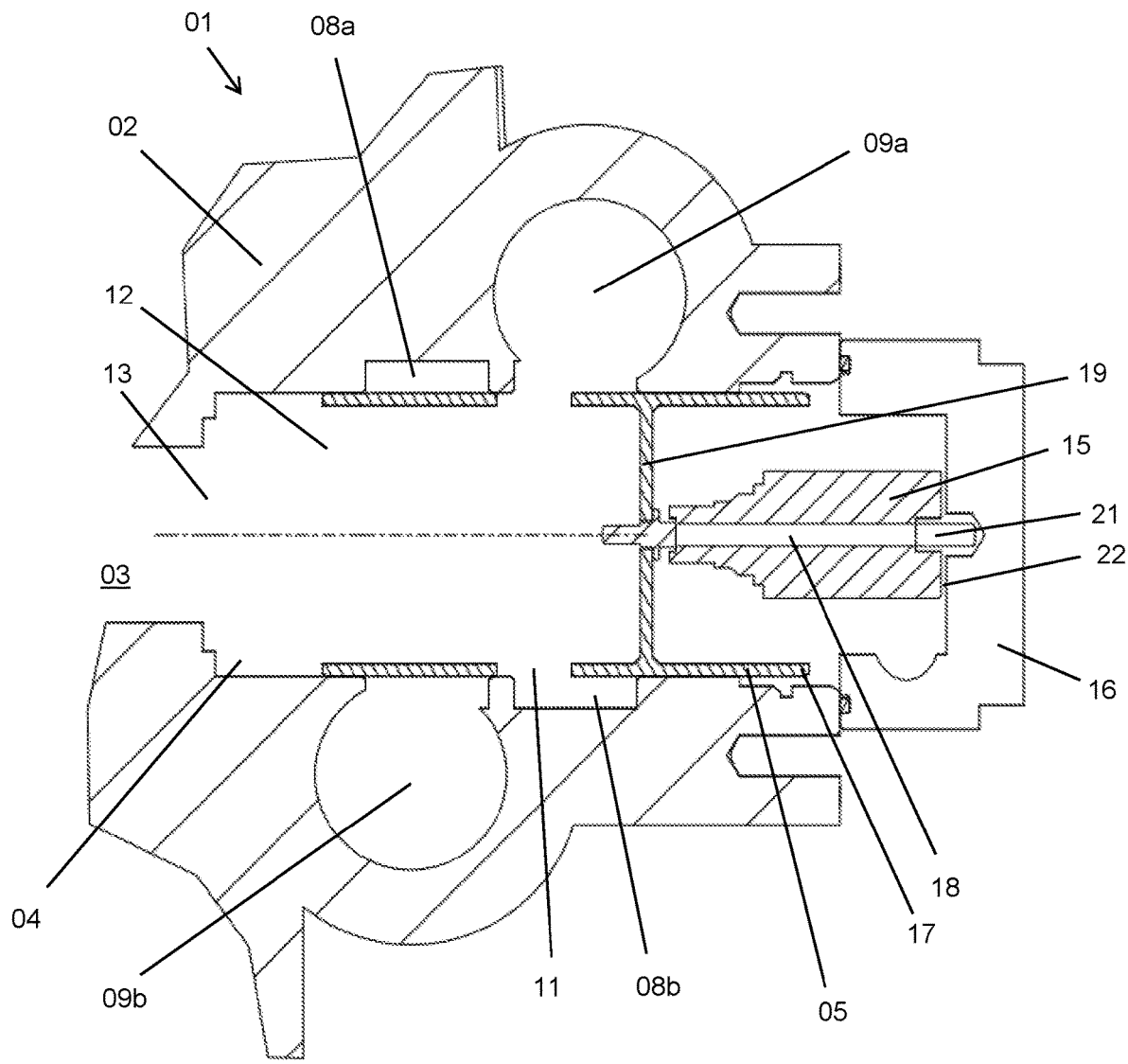

MIXING VALVE ARRANGEMENT FOR A HYDRAULIC SYSTEM, INCLUDING AN OIL COOLING SYSTEM AND COMPRESSOR SYSTEM

CROSS-REFERENCE TO RELATED APPLICATIONS

This application claims priority to German Patent Application No. DE102017108186.0, filed with the German Patent Office on Apr. 18, 2017, the contents of which are hereby incorporated in their entirety.

BACKGROUND

The invention is related to a mixing valve layout for a hydraulic system. The mixing valve arrangement comprises a mixing cylinder, a mixing piston and a drive, said drive moving the mixing piston axially with regards to the mixing cylinder, for the passage of different amounts of medium into the mixing cylinder. The invention is also related to an oil cooling system with said mixing valve arrangement as well as a compressor system equipped with said cooling system.

Mixing valve arrangements are required for most diverse technical implementations, when different media or similar media with distinct properties are to be mixed in large volumes. A typical application is the mixing of fluid media, specifically water, oil or other hydraulic fluids, for the provision of a pre-set initial temperature of the medium, for which purpose a medium component with a higher temperature is mixed with a medium component of a lower temperature. The mixing valve arrangement so controls the temperature of the mixed medium to be provided via the flow mixtures of both media components.

From EP 2 484 911 A2 an arrangement is known for the control of the operating temperature at an oil injected pressurized-air compressor, comprising a temperature-controlled mixing valve for the preparation of oil at a desired temperature. The valve has a control element of varying size.

From EP 2 526 297 B1 a compressor system is known, which uses a valve in the lubricant circuit. In a valve housing a mixing compartment is provided, in which hot and/or cooled lubricant are variably entered and mixed. A collar arrangement inside the valve housing is connected to an external actuator, said actuator moving the collar axially between a first and a second position in the housing.

The afore-mentioned solution has the disadvantage that the actuator outside of the valve housing is to be connected to the collar via a thrust rod which must be directed through the housing. Normally, a high pressure is generated in the valve housing, causing sealing issues at the passage point between the valve housing and the axially movable thrust rod. The leakage of lubricant at this point is a permanent unavoidable issue. The actuator must also produce great forces, as not only must it overcome great frictional forces at the sealing points for the axial movement of the collar, but also does it counteract the pressure available in the valve housing.

SUMMARY

The present invention has the task to provide an enhanced mixing valve arrangement, based on the state-of-the-art, which overcomes the mentioned disadvantages. Furthermore, an enhanced oil cooling system must be provided which is specifically to be used in a compressor system. Said task and other tasks are solved through a mixing valve arrangement according to attached claim 1, an oil cooling system according to claim 1 and a compressor system according to claim 10. The dependent claims specify preferred embodiments.

The inventive mixing valve arrangement also comprises a media cavity, to be filled with a preferably fluid medium. In the medium cavity a mixing cylinder is formed, as well as at least a first and a second inlet chamber and an outlet. The inlet chambers are axially offset and each connected to an assigned medium feed channel. The inlet chambers culminate in the medium cylinder or merge into it. At least two fluid components are fed for mixing via the medium feed channels. The mixing valve arrangement further comprises a mixing piston, which is axially mounted and movable in the mixing cylinder. The mixing piston is provided with at least one flow path with at least one inlet opening which is preferably arranged circumferentially of the mixing piston, said inlet opening provided with at least one outlet opening, preferably positioned axially on one end face of the mixing piston.

Depending on the axial position of the mixing piston, the inlet opening with a variable cross-section culminates in the first and/order second inlet chamber, according to the axial position, making available a variable cross-section for the passage of the medium via the first and/or the second inlet chamber. This changes the respective volume flow of the medium components that are mixed in the mixing chamber. The outlet opening culminates in the outlet of the mixing cylinder, in order to provide the mixed medium there. According to the axial displacement possibility of the mixing piston, as well as the harmonized position of the inlet chambers and the inlet opening in the mixing piston, most distinct operating condition settings are available. Normally, the distinct axial positions of the mixing piston allow the passage of the first medium component only via the first medium chamber, the second medium component only via the second medium chamber, or the simultaneous passage of variable quantities of both components, which are mixed and provided at the outlet. In certain applications, the mixing valve is closed completely, impeding the passage of both components.

The mixing valve arrangement further comprises a thrust rod which is axially mounted and movable and connected as an actuator to the mixing piston, in order to change the axial position thereof with regards to the mixing cylinder. Also a drive is provided, which is connected as an actuator to the thrust rod for the axial movement of said thrust rod along with the mixing piston. By the axial movement of the mixing piston inside the mixing cylinder, the above-described positions are achieved, resulting in the supply of different volumes of the media components.

According to the invention, the mixing valve arrangement is actuated by an electrical motor, which is completely arranged inside the medium cavity.

A significant advantage of the present invention consists in the fact that moved parts are no longer directed out from the medium cavity, so that leakages are excluded. The complete electrical motor is located in the medium, which flows through the cavity. Only the power supply or control lines for the motor are still to be directed outwards, but said supply or control lines do not move and their passage points are easily sealed. A further advantage is that the motor and the thrust rod actuated by said motor are always loaded with the same pressure, which is generated in the medium cavity. For an axial movement of the thrust rod and the mixing piston connected to it, no static pressure differences need therefore to be overcome and low actuating forces are sufficient.

According to a modified embodiment, the mixing cylinder can be provided with more than two inlet chambers, for the corresponding supply and mixing of several medium components. In a preferred embodiment, inlet chambers are arranged as annular cross-sectional expansions of the mixing cylinder. Said cross-sectional expansions may be positioned in parallel, axially spaced cross-sectional planes of the mixing cylinder, extending over the entire circumference or over a smaller section only.

The mixing piston is preferably formed as a cylindrical sleeve, provided with several slot-shaped inlet openings distributed at the circumference. Once the respective axial position of the mixing piston is selected, the inlet openings are opposed to the inlet chambers, allowing the passage of the medium from the inlet chamber inside the sleeve, or the inlet openings are axially offset to the inlet chambers, so that the passage of the medium is impeded. The volume flow can be controlled through intermediate positions with only a partially opened inlet opening to the respective chamber.

According to a preferred embodiment, the electrical motor is a step motor with an axially movable drive rod connected to the thrust rod or integrated into the same. In a simpler case, the drive rod axially driven out from the step motor thus forms the thrust rod and is directly connected to the mixing piston.

A special embodiment is characterized in that the complete electrical motor is arranged pressure-open in the medium cavity, so that pressure differences along its axial extension are avoided irrespective from the axial position of the mixing piston. For this purpose, the complete electrical motor or a section thereof is seated in the mixing cylinder itself.

One embodiment shows the medium cavity that is locked with a closing plate in the area of an end face of the mixing cylinder, namely at its ending that is axially opposite to the outlet. The closing plate preferably carries the electrical motor. Opposite the housing circumferencing the medium cavity, the electrical motor is to be closed, e.g., with a traditional seal. An additional advantage is that with a pressure equalization channel running from a mixing cylinder into the closing plate, the pressure between both axial ends of the electrical motor housing can be equalized.

According to a preferred embodiment, there is a configuration of the mixing valve arrangement for the temperature control in an oil circuit, whereby oil is supplied via the first inlet chamber at a first temperature and via the second inlet chamber at a second temperature. The dimensions of the mixing arrangement are preferably such so as to allow the replacement of previously usual thermostat valves without any further construction changes.

For the control of the motor, a signal is provided from an external control unit, depending on the desired mixing proportion of the medium components. If the mixture is to be performed according to the temperature, temperature sensors are required, said temperature sensors specifically recording and providing the temperature of the mixed medium at the outlet of the mixing cylinder and, if required, also the temperatures of the medium components at the inlet chambers and the control unit. According to a preferred embodiment, at least one temperature sensor is integrated in the mixing valve arrangement.

The invention also provides an oil cooling system with a closed oil circuit and a cooler for the cooling of the circulated oil, with a heat source for the cooled oil supply at a pre-set input temperature and with a temperature control unit for the setting of the pre-set input temperature. The temperature control unit comprises a mixing valve arrangement of one of the previously described embodiments or combinations thereof. Finally, the invention provides a compressor system with an oil-injection compressor unit for the generation of pressurized air and with said oil cooling system.

BRIEF DESCRIPTION OF THE DRAWINGS

Further advantages and singularities of the invention are provided by the following description of a preferred embodiment in accordance with the drawing.

The single FIGURE shows a section view of a section of an inventive mixing valve arrangement.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

The mixing valve arrangement 01 has a housing 02, said housing being an integrated part of a hydraulic system, e.g. an oil cooling system. Within the housing 02, a medium cavity 03 is formed, in which a medium is passed during operation. A section of the medium cavity 03 forms a mixing cylinder 04, in which a mixing piston 05 is arranged, said mixing piston movable in axial direction. A coil spring 07 has an axial effect on the mixing piston 05 and presses it into a zero condition.

The wall sections of a mixing cylinder 04 are adjacent to a first inlet chamber 08a and a second inlet chamber 08b. The inlet chambers 08 extend as annular sections around the mixing cylinder 04 and are opened inside them, provided this opening is not closed by the wall of the mixing piston 05. The inlet chambers are connected respectively to a medium supply channel 09a, 09b, along which the medium components are supplied for their mixing. The mixing cylinder 04 has several inlet openings 11 in its wall, said inlet openings being formed as slots oriented at the circumference. Should due to the appropriate axial positioning of the mixing piston, the inlet openings 11 be in any case congruent with the inlet chambers 08, the corresponding medium component passes inside the medium piston. The flow path then runs through an outlet opening 12 located at the end face of the mixing piston 05 to an outlet 13 of the mixing cylinder 04.

The mixing valve arrangement further comprises an electrical motor 15, said electrical motor preferably being a step motor and operating as and adjusting drive for the mixing piston 05. The electrical motor is fitted to a closing plate 16, said closing plate sealing tightly the medium cavity 03 at the end of the mixing cylinder 04. The complete motor is so arranged inside the medium cavity, meaning that equal pressure ratios are available on all sides.

In the illustrated embodiment, the electrical motor section averted from the closing plate 16 partially intrudes into an integrated section 17 of the mixing piston 05. The electrical motor 15 is connected as an actuator to the mixing piston 05 via an axially movable drive rod 18. The drive rod 18 functions as a thrust rod, which by the actuation of the electrical motor, performs an axial movement of the mixing piston 05 in the mixing cylinder 04. At the ending on the piston side, the drive rod 18 is mounted e.g. on an intermediate plate 19 of the mixing piston 05. The intermediate plate is preferably provided with openings (not shown), so that equal pressure ratios are available at both sides of the intermediate plate 19. At the opposite axial side, the drive rod 18 is directed out of the motor housing with one pressure ending 21, said pressure ending 21 being located in the medium cavity 03 and subject to the same pressure as the mixing piston 05. If other constructive measures are not already sufficient for the manufacturing of a pressure-open connection, a separate pressure equalization channel 22 is provided, connecting the mixing cylinder 04 to the rear side of the electrical motor and the open pressure ending 21 of the drive rod 18.

REFERENCE SIGN LIST

1 Mixing valve arrangement
2 Housing
3 medium cavity
4 Mixing cylinder
5 Mixing piston
6
7 Coil spring
8 Inlet chambers
9 Medium supply channels
10
11 Inlet opening
12 Outlet opening
13 Outlet
14
15 Electrical motor
16 Closing plate
17 Integrated section
18 Drive rod/Thrust rod
19 Intermediate plate
20
21 Pressure ending
21 Pressure equalization channel Various features and advantages of the disclosure are set forth in the following claims.

What is claimed is:

1. A mixing valve arrangement for a hydraulic system, the mixing valve arrangement comprising:
 a cavity in which a mixing cylinder, at least one first and second inlet chamber as well as an outlet are provided, said first and second inlet chambers being axially offset and each in communication with a respective supply channel and supply channel and in communication with the mixing cylinder, whereby via the supply channels at least two components are supplied for their mixing;
 a mixing piston, which is axially mounted and movable in the mixing cylinder, presenting at least one flow path which, according to the axial position of the mixing piston, communicates the first and/or the second inlet chamber with the outlet;
 a thrust rod, which is axially mounted and movable and connected to the mixing piston in order to change the axial position thereof; and
 a drive, said drive being connected as an actuator to the thrust rod for the axial movement thereof; characterized in that the drive is an electrical motor, which is completely arranged inside the cavity.

2. The mixing valve arrangement according to claim 1, characterized in that the electrical motor is a step motor.

3. The mixing valve arrangement according to claim 1, characterized in that the electrical motor is open on all sides to the cavity.

4. The mixing valve arrangement according to claim 1, characterized in that the first and second inlet chambers are formed as annular cross-section expansions of the mixing cylinder.

5. The mixing valve arrangement according to claim 1, characterized in that the mixing piston is formed as a cylindrical sleeve, provided with several slot-shaped inlet openings circumferentially distributed.

6. The mixing valve arrangement according to claim 1, characterized in that a pressure equalization channel passes through a plate of the mixing piston in order to provide a pressure equalization on all sides of the electrical motor.

\* \* \* \* \*